Aug. 12, 1930.  L. SAWYER  1,772,783
AIR CUSHION FOR BEDPANS
Filed Oct. 19, 1929
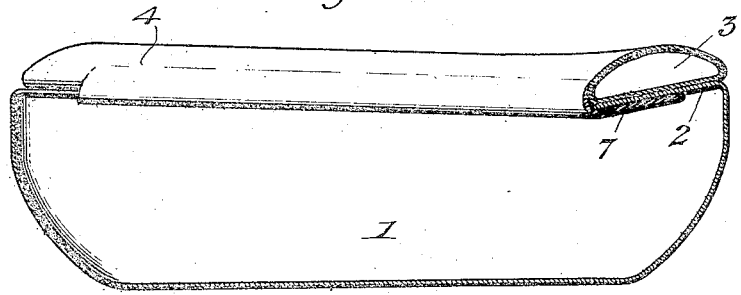
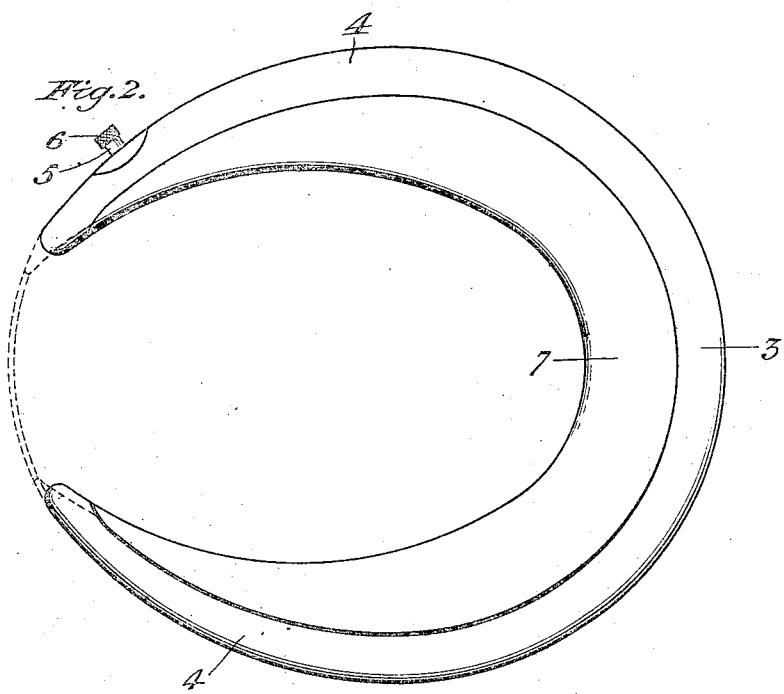
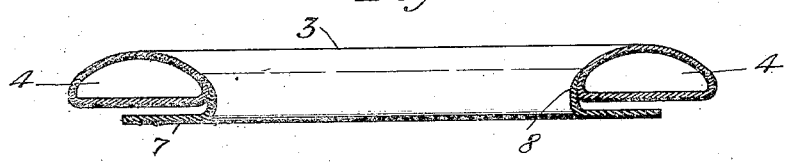
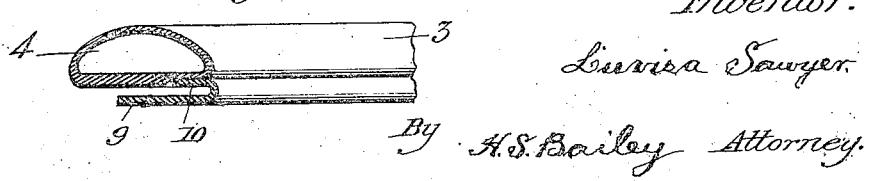
Inventor:
Lovisa Sawyer.
By H. S. Bailey Attorney.

Patented Aug. 12, 1930

1,772,783

UNITED STATES PATENT OFFICE

LUVISA SAWYER, OF DENVER, COLORADO

AIR CUSHION FOR BEDPANS

Application filed October 19, 1929. Serial No. 400,801.

My invention relates to air cushions for bed pans.

The object of the invention is to provide an air cushion adapted especially for use in conjunction with standard bed pans, the said cushion being provided with means whereby it can be secured upon the seat flange of the pan so as to be held against slipping movement when the pan is in use.

Further, to provide a cushion of this character which is simple in construction, which can be easily attached to or detached from the pan and which is so constructed that it can be easily kept in a sanitary condition.

These objects are accomplished by the style of cushion illustrated in the accompanying drawings in which, Fig. 1 is a longitudinal sectional view of a bed pan to which the improved air cushion is secured.

Fig. 2 is a bottom plan view of the cushion showing the retaining lip by which the cushion is secured to the seat flange of the pan.

Fig. 3 is a transverse vertical section through the cushion showing clearly the retaining lip which fits under the seat flange of the pan, and Fig. 4 is a similar view through a portion of the cushion, showing a slightly different manner of securing the retaining lip to the cushion.

The present invention has for its object to render the use of the bed pan more comfortable than is otherwise possible, and particularly in cases where the user is emaciated, or in such physical condition that contact with the bare metal seat flange of the pan would cause great discomfort.

Referring to the accompanying drawings, the numeral 1 indicates a standard bed pan, which is substantially of the outline shown in full and dotted lines in Fig. 2.

The pan is formed with a seat flange 2 which is about four inches wide at the back end of the pan, the width being gradually decreased toward the front end of the pan, thus forming a seat having an oval-shaped opening as will be understood by reference to Fig. 2.

The improved cushion 3 is in the form of a hollow rubber bag, and in order to accommodate the cushion to the standard pan, the said cushion is crescent shaped, or substantially in the form of a horse shoe, the closed end thereof being its rear end, and the two arms 4 of the cushion being tapered in width toward their ends, so as to conform to the shape of the seat flange.

One of the arms is provided with a filling tube 5 which is preferably located near the end of the arm, and is provided with the usual screw cap 6, through which the bag may be inflated, the cap being screwed down to prevent the escape of air, this feature being in common use.

A flat, hard rubber retaining lip 7 is secured to the cushion by vulcanization, so as to lie beneath the underside of the cushion and a slight distance from it, as clearly shown in Figures 3 and 4.

This lip conforms to the shape of the cushion but is of less width than the cushion and it may be connected as shown either in Fig. 3 or in Fig. 4. As shown in Fig. 3 the inner edge of the lip terminates in a right angled member 8, which is vulcanized to the inner edge portion of the cushion, the lip being spaced from the bottom of the cushion as shown. In Fig. 4 a lip 9 is shown which is folded upon itself to form a parallel member 10 of less width than the lip, and this member 10 is vulcanized to the under side of the cushion and next to the inner edge thereof, so that the lip, in either case, becomes a part of the cushion.

In use, the cushion is inflated under more or less pressure, as may be required, and in order to secure it upon the pan, it is bent or bowed to reduce its width sufficiently to permit the opposite side edges of the lip to pass in under the front ends of the seat flange 2, and as the cushion is pushed toward the rear end of the pan, it will automatically expand or straighten out so that the entire lip will lie beneath the seat flange, as shown in Fig. 1, and as the extreme distance between the side edges of the lip is much greater than the distance between terminal ends of the seat flange, the lip cannot slip from under the seat flange, and it therefore holds the cushion securely upon the pan, and against movement in any direction.

The cushion can be disconnected from the pan by bowing it as above described, to reduce the distance between the side edges of the lip and then slipping the lip out through the opening formed by the front ends of the seat flange. The bottom side of the cushion is made flat so as to rest squarely upon the seat flange, and the lip will always engage the under side of the said flange. The cushion and its retaining lip being made of rubber can be easily kept in a sanitary condition.

Having described my invention what I claim as new and desire to secure by Letters Patent, is:

The combination with a bed pan having a seat flange; of a substantially crescent shaped air cushion which rests upon said flange and is of the full length of the pan; and a hard rubber lip vulcanized to the underside of said cushion, and of the same shape, which engages the under side of the seat flange thereby to hold the cushion on the pan, said lip being of greater width than the width of the opening in the pan.

In testimony whereof, I affix my signature.

LUVISA SAWYER.